US008261982B2

(12) United States Patent
Oestreicher et al.

(10) Patent No.: US 8,261,982 B2
(45) Date of Patent: Sep. 11, 2012

(54) SOLICITATION-RESPONSE LIFECYCLE TRACKING AND MANAGEMENT

(75) Inventors: Ronald William Oestreicher, Pembroke Pines, FL (US); Dean Victor Vocaturo, Wellington, FL (US)

(73) Assignee: American Express Travel Related Services Company, Inc., New York, NY (US)

( * ) Notice: Subject to any disclaimer, the term of this patent is extended or adjusted under 35 U.S.C. 154(b) by 336 days.

(21) Appl. No.: 12/044,781

(22) Filed: Mar. 7, 2008

(65) Prior Publication Data
US 2009/0224038 A1    Sep. 10, 2009

(51) Int. Cl.
*G06F 19/00* (2011.01)
*G06Q 30/00* (2012.01)
*G06Q 90/00* (2006.01)

(52) U.S. Cl. ............ 235/385; 705/30; 705/40; 705/333; 235/375; 235/376; 235/379; 235/384

(58) Field of Classification Search .................. 235/379, 235/385, 376, 383, 375, 386, 384; 705/39, 705/14.25, 14.38, 14.39, 14.26, 406, 410, 705/10, 404, 340, 408, 401
See application file for complete search history.

(56) References Cited

U.S. PATENT DOCUMENTS

| | | | |
|---|---|---|---|
| 4,543,082 A | | 9/1985 | Stenner |
| 4,752,675 A | | 6/1988 | Zetmeir |
| 4,908,761 A | * | 3/1990 | Tai .............................. 705/14.26 |
| 5,774,869 A | * | 6/1998 | Toader ....................... 705/14.19 |
| 5,970,467 A | * | 10/1999 | Alavi ........................... 705/7.32 |
| 6,230,143 B1 | * | 5/2001 | Simons et al. .............. 705/14.25 |
| 6,493,110 B1 | * | 12/2002 | Roberts ........................... 358/1.2 |
| 6,510,992 B2 | * | 1/2003 | Wells et al. .................... 235/385 |
| 6,526,393 B1 | * | 2/2003 | Fredman ........................ 705/408 |
| 6,557,755 B1 | * | 5/2003 | Pickering et al. ............. 235/376 |
| 6,584,448 B1 | * | 6/2003 | Laor ........................... 705/14.26 |
| 6,663,105 B1 | | 12/2003 | Sullivan et al. |
| 6,678,685 B2 | * | 1/2004 | McGill et al. .................... 725/34 |
| 6,793,136 B2 | * | 9/2004 | Wells et al. .................... 235/385 |
| 6,801,833 B2 | | 10/2004 | Pintsov et al. |
| 6,999,938 B1 | | 2/2006 | Libman |
| 7,021,528 B2 | * | 4/2006 | Igval et al. ..................... 235/379 |

(Continued)

OTHER PUBLICATIONS

"Regulus Announces the Launch of i-Trace!(SM)." PR Newswire Nov. 2, 2003 Business Dateline, ProQuest. Web. Apr. 20, 2012.*
"Roska Direct Selected as Beta Site for USPS 'MailTrak—PLANET Code' Service." PR Newswire Apr. 17, 2000 Business Dateline, ProQuest. Web. Apr. 20, 2012.*
Final Rejection mailed Feb. 18, 2010 in U.S. Appl. No. 12/437,491.
International Search Report and Written Opinion for International Application No. PCT/US2009/036278 dated Apr. 16, 2009.

(Continued)

*Primary Examiner* — Matthew Gart
*Assistant Examiner* — Olusegun Goyea
(74) *Attorney, Agent, or Firm* — Snell & Wilmer L.L.P.

(57) ABSTRACT

Tracking and management data for a solicitation and response lifecycle is disclosed. The system generates and links tracking data for both the solicitation and the response, generates indicators that include the tracking data, and encodes the indicators so that the indicators are detectable as they traverse various events and locations throughout the lifecycle. A detailed audit trail of each event in the correspondence and response lifecycle is constructed using data matching methods and various statistics regarding the lifecycle, such that the response habits of customers are formulated.

17 Claims, 4 Drawing Sheets

U.S. PATENT DOCUMENTS

| | | | |
|---|---|---|---|
| 7,177,828 B1 | 2/2007 | Land et al. | |
| 7,341,186 B2* | 3/2008 | Mrozik et al. | 235/384 |
| 7,620,201 B2* | 11/2009 | Euchner et al. | 382/101 |
| 7,644,004 B2* | 1/2010 | Guyett et al. | 705/1.1 |
| 7,644,010 B2* | 1/2010 | Haas et al. | 705/12 |
| 7,798,417 B2* | 9/2010 | Snyder et al. | 235/494 |
| 7,904,394 B2* | 3/2011 | Marks et al. | 705/404 |
| 8,024,063 B2 | 9/2011 | Redford et al. | |
| 2001/0032881 A1* | 10/2001 | Wells et al. | 235/385 |
| 2002/0026356 A1 | 2/2002 | Bergh et al. | |
| 2003/0111524 A1* | 6/2003 | Wells et al. | 235/375 |
| 2004/0103023 A1* | 5/2004 | Irwin et al. | 705/14 |
| 2004/0111328 A1 | 6/2004 | Espejo et al. | |
| 2004/0117451 A1 | 6/2004 | Chung | |
| 2004/0230543 A1* | 11/2004 | Baker et al. | 705/401 |
| 2004/0243698 A1* | 12/2004 | Blankenship | 709/224 |
| 2005/0006470 A1* | 1/2005 | Mrozik et al. | 235/385 |
| 2005/0010430 A1 | 1/2005 | Gockel et al. | |
| 2005/0077353 A1 | 4/2005 | Pintsov et al. | |
| 2005/0154673 A1 | 7/2005 | Fellenstein et al. | |
| 2005/0171919 A1* | 8/2005 | Baker et al. | 705/404 |
| 2005/0197974 A1 | 9/2005 | Schenck et al. | |
| 2005/0222906 A1 | 10/2005 | Chen | |
| 2006/0049252 A1* | 3/2006 | Guyett et al. | 235/386 |
| 2006/0053084 A1* | 3/2006 | Haas et al. | 705/410 |
| 2006/0053085 A1* | 3/2006 | Guyett et al. | 705/410 |
| 2006/0168034 A1* | 7/2006 | Euchner et al. | 709/206 |
| 2006/0235710 A1* | 10/2006 | Hodess et al. | 705/1 |
| 2006/0271236 A1* | 11/2006 | Rosen et al. | 700/221 |
| 2006/0287954 A1 | 12/2006 | DeWitt et al. | |
| 2007/0007328 A1* | 1/2007 | Cole et al. | 235/375 |
| 2007/0095904 A1* | 5/2007 | Barta et al. | 235/384 |
| 2007/0111706 A1 | 5/2007 | Kumar et al. | |
| 2007/0156557 A1* | 7/2007 | Shao et al. | 705/35 |
| 2007/0162341 A1* | 7/2007 | McConnell et al. | 705/14 |
| 2007/0203785 A1* | 8/2007 | Thompson et al. | 705/10 |
| 2008/0040133 A1* | 2/2008 | Foth et al. | 705/1 |
| 2008/0082931 A1 | 4/2008 | Morrel-Samuels | |
| 2008/0100874 A1* | 5/2008 | Mayer | 358/403 |
| 2008/0104408 A1* | 5/2008 | Mayer | 713/178 |
| 2008/0133351 A1 | 6/2008 | White et al. | |
| 2008/0210749 A1* | 9/2008 | Skaaksrud et al. | 235/375 |
| 2009/0048704 A1* | 2/2009 | Redford | 700/224 |
| 2009/0057403 A1* | 3/2009 | Marks et al. | 235/385 |
| 2009/0058609 A1* | 3/2009 | Clayman | 340/10.1 |
| 2009/0063197 A1 | 3/2009 | Lisle | |
| 2009/0145967 A1* | 6/2009 | Carpenter | 235/385 |
| 2009/0159509 A1* | 6/2009 | Wojdyla et al. | 209/584 |
| 2009/0164662 A1* | 6/2009 | Mather | 709/243 |
| 2009/0218262 A1* | 9/2009 | Bowers et al. | 209/584 |
| 2009/0224038 A1* | 9/2009 | Oestreicher et al. | 235/385 |
| 2009/0228375 A1 | 9/2009 | Ford et al. | |
| 2009/0307079 A1 | 12/2009 | Martin, Jr. | |
| 2009/0313068 A1* | 12/2009 | Boerkei et al. | 705/7 |
| 2010/0145883 A1* | 6/2010 | Guyett et al. | 705/406 |
| 2010/0161993 A1* | 6/2010 | Mayer | 713/178 |

OTHER PUBLICATIONS

International Search Report and Written Opinion for International Application No. PCT/US2010/31358 dated Jun. 9, 2010.
USPTO; Office Action dated Nov. 26, 2010 in U.S. Appl. No. 12/427,225.
PCT; International Search Report dated Oct. 28, 2010 in Application No. PCT/US2010/047491.
USPTO; Advisory Action dated Apr. 30, 2010 in U.S. Appl. No. 12/437,491.
USPTO; Office Action dated Jul. 21, 2009 in U.S. Appl. No. 12/437,491.
USPTO; Office Action dated Oct. 28, 2010 in U.S. Appl. No. 12/437,494.
Office Action dated Feb. 10, 2011 in U.S. Appl. No. 12/437,491.
Final Office Action dated Mar. 10, 2011 in U.S. Appl. No. 12/427,225.
Advisory Action dated May 6, 2011 in U.S. Appl. No. 12/427,225.
Final Office Action dated Feb. 25, 2011 in U.S. Appl. No. 12/437,494.
Advisory Action dated May 5, 2011 in U.S. Appl. No. 12/437,494.
Final Office Action dated Jul. 14, 2011 in U.S. Appl. No. 12/437,491.
Office Action dated May 20, 2011 in U.S. Appl. No. 12/427,225.
Office Action dated Jun. 3, 2011 in U.S. Appl. No. 12/437,494.
International Preliminary Report on Patentability for Application No. PCT/US2009/036278 dated Apr. 29, 2011.
Advisory Action mailed Sep. 19, 2011 in U.S. Appl. No. 12/437,491.
Final Office Action dated Oct. 21, 2011 in U.S. Appl. No. 12/427,225.
Office Action dated Aug. 8, 2011 in U.S. Appl. No. 12/437,496.
AU; Examiner's First Report received Aug. 4, 2011 in Application No. 2009223530.
Second Written Opinion dated Sep. 29, 2011 in Application No. PCT/US2010/047491.
International Preliminary Report on Patentability dated Oct. 14, 2011 Application No. PCT/US2010/31358.
Advisory Action dated Feb. 10, 2012 in U.S. Appl. No. 12/427,225.
Advisory Action dated Jan. 27, 2012 in U.S. Appl. No. 12/437,494.
Office Action dated Feb. 16, 2012 in U.S. Appl. No. 12/437,494.
Final Office Action dated Mar. 30, 2012 in U.S. Appl. No. 12/437,496.
Office Action dated Feb. 21, 2012 in U.S. Appl. No. 12/552,717.
Final Office Action dated Nov. 17, 2011 in U.S. Appl. No. 12/437,494.

* cited by examiner

SOLICITATION-RESPONSE LIFECYCLE TRACKING AND MANAGEMENT

FIELD OF THE INVENTION

The present invention generally relates to tracking and management data, and more particularly, to providing more accurate and more detailed information related to each portion of the solicitation and response lifecycle.

BACKGROUND OF THE INVENTION

Modern organizations often need to access data to manage their enterprises effectively. Generally, more accurate and more timely data enables improved product quality, improved customer service, lower costs and higher profitability. The vast amount of capital resources, human resources and physical resources that a typical organization commits to collecting, processing and analyzing data typically indicates the value to an organization of accurate and timely data. Information regarding customer activity and preferences is of particular value. Customers are the key to success for most organizations, whether the customers are current revenue producing customers, potential customers or constituents in a government or non-profit organization. Therefore, organizations spend large amounts of time, effort and money collecting, monitoring, evaluating, analyzing and forecasting customer activity. The data collected about customers may be as broad as an industry or market study, or as narrow as how a particular demographic or individual customer responds to a directed solicitation. Organizations use this data, for example, to optimize operations, improve financial performance, formulate product strategy, target marketing efforts and formulate plans from the broadest strategic vision down to the most detailed operational detail.

One type of customer data that is often valuable to an organization relates to timing with which a customer or potential customer responds to a solicitation. For instance, rapid turnaround of a marketing solicitation may indicate a healthy, eager demand for a particular product or service. Similarly, quick payment of a bill may indicate a happy customer, a financially sound customer and/or a customer that prefers to minimize outstanding debt.

Detailed information related to customer payment habits is of particular interest to an organization's financial operation because the information is often used to better forecast cash flows, to modify billing procedures and to increase rapid payment of bills. Due to the importance of cash in running a business, it is usually in a company's best interest to collect outstanding receivables as quickly as possible. Organizations typically calculate the average collection period as the approximate amount of time that it takes for a business to receive payments owed from its customers and clients. Many businesses allow customers to purchase goods or services via credit, but one of the problems with extending credit is not knowing when the customer will make cash payments. Therefore, decreasing the average collection period is often desirable because this means that it does not take a company very long to turn its receivables into cash. See, for instance, http://www.investopedia.com for general information regarding the importance to organizations of converting receivables into cash.

Organizations usually employ many different strategies, technologies and methods in an attempt to reduce the average collection period for receivables. One approach is to optimize remittance collection by getting bills into the hands of the customers who are most willing or able to pay the bills. In some billing organizations, this approach is called customer-based work prioritization. Such prioritization is crucial for organizations with complex billing processes and large billing volumes. For such organizations, access to granular data that provides visibility into each discrete event, and the duration between these events, in the bill-to-payment lifecycle is typically critical. These events are not readily tracked by current methods and solutions for tracking a correspondence. Current solutions only provide a rough estimate of the actual time between when a customer receives a bill and when the customer remits payment of the bill. Therefore, a long-felt need exists for a method to determine much more precisely when the customer sends the remittance and to link the tracking information gathered for the bill to the tracking information gathered for the remittance.

SUMMARY OF THE INVENTION

The present invention improves upon existing systems and processes by providing a tangible, integrated, end-to-end customer solicitation and response lifecycle tracking mechanism. When an organization generates a solicitation to a customer and also provides a way to respond to the solicitation, the system generates tracking data for both the solicitation and the response. The two sets of tracking data are linked such that tracking information collected for the solicitation is linked to tracking information for the response. Indicators are generated that encode the tracking data and the indicators are attached to the outgoing solicitation and the incoming response. Service providers (e.g., the U.S. Postal Service ("USPS")) detect the indicator and store additional information regarding the time, place and status of the detected parcel. A data transfer or data sharing method provides access to the service provider data and the data is matched using various methods. A detailed audit trail of each event in the correspondence and response lifecycle is constructed. Various statistics regarding the lifecycle, and specifically the response habits of customers, is also formulated.

In one embodiment, the solicitation is a customer bill and the response is the remittance of the bill. In such an embodiment, the invention includes: i) generating a payment lifecycle tracking dataset; ii) storing the payment lifecycle tracking dataset in a tracking database; iii) encoding first invoice tracking data as an invoice tracking indicator on a customer bill such that the invoice tracking indicator is configured to be detected; iv) encoding remittance tracking data as a remittance tracking indicator on a customer bill such that the remittance tracking indicator is configured to be detected; v) receiving additional tracking data from a service provider where the additional data is based on detection of the invoice tracking indicators and includes the data detected along with additional information; vi) matching the payment lifecycle tracking dataset with the additional tracking data to create matched tracking data; and vii) analyzing customer payment habits based on matched tracking data.

BRIEF DESCRIPTION OF THE DRAWINGS

A more complete understanding of the invention may be derived by referring to the detailed description and claims when considered in connection with the Figures, wherein like reference numbers refer to similar elements throughout the Figures, and:

DETAILED DESCRIPTION OF EXEMPLARY EMBODIMENTS

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In one embodiment, the system includes a billing and management system, a billing system, a lifecycle management and reporting module, an application server, a data download module and various databases. While the system may contemplate upgrades or reconfigurations of existing processing systems, changes to existing databases and business information system tools are not necessarily required by the present invention. For example, the present system may contemplate, but does not require, downloading data from the USPS using file transfer protocol (FTP). Moreover, the system may be seamlessly integrated into existing information technology and data management architectures and business information system tools with minimal changes to existing systems.

"Organization," as used herein, may include any individual, group, business, entity, government entity, transaction account issuer (e.g., credit, charge, etc), merchant, consortium of merchants, customer, account holder, charitable organization, software, hardware, and/or any other entity or party.

A "soliciting organization" includes any organization, software and/or hardware that contacts another organization or person such as, for example, a customer. A soliciting organization often contacts another entity and expects to receive some response. As used herein, a "solicitation" includes any form of communication (e.g. a bill, marketing piece, etc) directed to a responding entity. A "responding entity" includes any organization, software and/or hardware such as, for example, a customer, potential customer or account holder to which a solicitation is directed. A "receivable" may include any physical or logical record or other tracking mechanism that serves to identify an expectation that the organization will receive a response from a solicitation. In one embodiment, one of the valid forms of an expected response may be defined as a non-response. For example, a marketing organization may send a customer survey to a set of potential customers, track the expectation of a response from each customer as a separate "receivable," and define the lack of a response as a valid response to the survey for tracking and reporting purposes.

In one embodiment, a "billing organization" includes a soliciting organization (or department within a larger organization) hardware and/or software that generates, distributes, tracks, etc. customer bills and payments. A billing organization may generate an invoice, a remittance and a receivable which represents the expectation that the invoice be paid via the remittance mechanism.

Intelligent Mail Barcode ("IMB") is a specially formatted bar code defined and specified by the USPS used to enable various tracking services. IMB is fully specified by the USPS publication INTELLIGENT MAIL® BARCODE (4-STATE CUSTOMER BARCODE), available at http://ribbs.usps.gov/OneCodeSOLUTION/SPUSPS-B-3200E001.pdf, which is hereby incorporated by reference.

An "indicator", as used herein, may include an IMB, a radio frequency identifier (RFID), a global positioning system (GPS) signal, a signal, a code, device, number, letter, symbol, digital certificate, smart chip, digital signal, analog signal, biometric, personal identification number (PIN), Internet code, magnetic stripe, optical, transponder and/or other identifier/indicia suitably configured to allow detection and/or data communication.

An "account", "account number" or "customer account" as used herein, may include any device, code (e.g., one or more of an authorization/access code, PIN, Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards card, charge card, credit card, debit card, prepaid card, telephone card, embossed card, smart card, magnetic stripe card, bar code card, transponder, radio frequency card or an associated account. The system may include or interface with any of the foregoing cards or devices, or a fob having a transponder and RFID reader in RF communication with the fob. Although the system may include a fob embodiment, the invention is not to be so limited. Indeed, the system may include any device having a transponder which is configured to communicate with an RFID reader via RF communication. Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc.

The account number may be distributed and stored in any form of plastic, electronic, magnetic, radio frequency, wireless, audio and/or optical device capable of transmitting or downloading data from itself to a second device. A customer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four-spaced sets of numbers, as represented by the number "0000 0000 0000 0000". The first five to seven digits are reserved for processing purposes and identify the issuing bank, card type, etc. In this example, the last (sixteenth) digit is used as a sum check for the sixteen-digit number. The intermediary eight-to-ten digits are used to uniquely identify the customer. A merchant account number may be, for example, any number or alpha-numeric characters that identify a particular merchant for purposes of card acceptance, account reconciliation, reporting, or the like.

Exemplary benefits provided by this invention include increasing cash flow, optimizing financial operations, enabling customer-focused work prioritization, enhancing knowledge about customer activity and habits, enhancing customer functionality and satisfaction, and linking solicitation events to response events. The tool enables tracking data for both the solicitation and the response. The two sets of tracking data are linked so that tracking information collected for the solicitation is linked to tracking information for the response. The invention improves upon existing solutions because existing systems either provide no visibility, or, at best, provide poor or unreliable data regarding a more precise duration of each event during a solicitation and response lifecycle. In one embodiment the tool enables enhanced marketing operations by allowing marketing materials to be tracked. In one embodiment, the tool is used to track legal disclosures, member or customer agreements, can compliance to regulatory service level agreements.

While described herein in reference to tracking and maintaining billing and accounts receivable metrics for a transaction account issuer organization, practitioners will appreciate that the invention may further be implemented to increase speed, lower cost and improve cash flow management in a wide variety of industries. For instance, one embodiment may be implemented for a wireless phone company's billing operation that wishes to collect detailed, granular data regarding their bill-to-payment lifecycle. Other examples of such accounts receivable and payment tracking may be accomplished through a variety of computing resources and hardware infrastructures.

While the description makes reference to specific technologies, system architectures and data management techniques, practitioners will appreciate that this is but one embodiment and that other devices and/or methods may be implemented without departing from the scope of the invention. Similarly, while the description makes frequent reference to a web client, practitioners will appreciate that other examples of solicitation-response lifecycle tracking and management methods may be accomplished by using a variety of user interfaces including handheld devices such as personal digital assistants and cellular telephones. Practitioners will also appreciate that a web client is but one embodiment and that other devices and/or methods may be implemented without departing from the scope of the invention.

Figure 1:
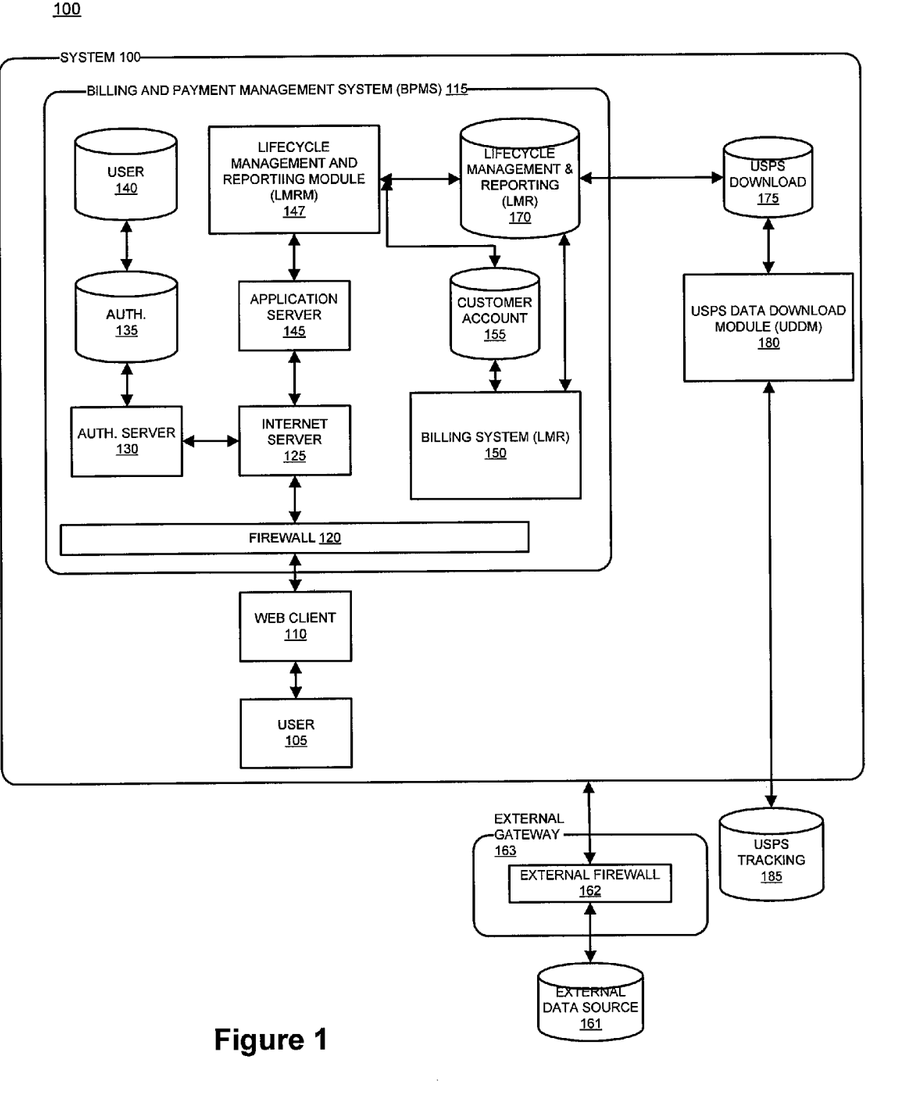
FIG. 1 is an overview of a representative system for tracking the lifecycle of a solicitation within a billing and payment management system, in accordance with one embodiment of the present invention.

With reference to FIG. 1, the system includes a user 105 interfacing with a billing and payment management system ("BPMS") 115 by way of a web client 110. A user is any individual, entity, organization, third-party entity, software and/or hardware that accesses BPMS 115 to view, analyze, audit, validate, utilize, evaluate, report, enhance or maintain data relating to the tracking and management of correspondence lifecycle tracking data. User 105 may be, for example, a strategic planning manager using the system to analyze the customers that typically pay an invoice within a week of receipt in the mail. User 105 may interface with Internet server 125 via any communication protocol, device or method discussed herein, known in the art, or later developed. In one embodiment, user 105 may interact with the BPMS 115 via an Internet browser at a web client 110.

While described in the context of information systems for a transaction account issuer billing operation, practitioners will appreciate that the present invention may be similarly used by any organization to track and manage a solicitation-response lifecycle. However, to simplify the explanation, the lifecycle tracking and management functions are often referenced herein in the context of tracking and maintaining billing and accounts receivable metrics for a transaction account issuer billing operation.

Transmissions between the user 105 and the Internet server 125 may pass through a firewall 120 to help ensure the integrity of the BPMS 115 components. Practitioners will appreciate that the invention may incorporate any number of security schemes or none at all. In one embodiment, the Internet server 125 receives page requests from the web client 110 and interacts with various other system 100 components to perform tasks related to requests from the web client 110. Internet server 125 may invoke an authentication server 130 to verify the identity of user 105 and assign specific access rights to user 105. Authentication database 135 may store information used in the authentication process such as, for example, user identifiers, passwords, access privileges, user preferences, user statistics, and the like. When a request to access system 100 is received from Internet server 125, access system 100 determines if authentication is required and transmits a prompt to the web client 110. User 105 enters authentication data at the web client 110, which transmits the authentication data to Internet server 125. Internet server 125 passes the authentication data to authentication server which queries the user database 140 for corresponding credentials. When user 105 is authenticated, user 105 may access various applications and their corresponding data sources.

When user 105 logs on to an application, Internet server 125 may invoke an application server 145. Application server 145 invokes logic in the lifecycle management and reporting module ("LMRM") 147 by passing parameters relating to the user's 105 requests for data.

As discussed in further detail in the process descriptions below, the LMRM 147 reads data from various databases such as, for example, the lifecycle management and reporting ("LMR") database 160 and the customer account database 155. LMRM 147 may include any hardware and/or software suitably configured to receive requests from the web client 110 via Internet server 125 and the application server 145. LMRM 147 is further configured to process requests, construct database queries, and/or execute queries against databases, external data sources and temporary databases, as well as exchange data with other application modules (not pictured). In one embodiment, the LMRM 147 may be configured to interact with other system 100 components to perform complex calculations, retrieve additional data, format data into reports, create XML representations of data, construct markup language documents, and/or the like. Moreover, the LMRM 147 may reside as a standalone system or may be incorporated with the application server 145 or any other BPMS 115 component as program code.

As practitioners will appreciate, while depicted as a single entity for the purposes of illustration, databases depicted in FIG. 1 may represent multiple physical and/or hardware, software, database, data structure and networking components. FIG. 1 depicts the types of databases that are included in an exemplary embodiment. The customer account database 155 stores tracking information, such as, for example, account numbers and receivable records, regarding customer accounts. The LMR database 160 stores tracking and reporting metrics associated with the lifecycle of a receivable. In one embodiment, the lifecycle of a receivable is also referred to as the bill-to-cash lifecycle. LMR database 160 is populated with data from various other data sources such as the customer account database 155 and the USPS download database 175. The customer account database 155 stores billing and invoice information. The USPS download database 175 maintains a copy of the information downloaded by the USPS data download module ("UDDM") 180. In one embodiment, UDDM 180 is a software module that links to the external data maintained by USPS. The UDDM 180 reads data from the USPS tracking database 185 and stores the data in USPS download database 175. The USPS tracking database 185 is an external database maintained by the USPS that provides delivery and package tracking information throughout the package delivery lifecycle.

In one embodiment, USPS tracking database 185 is the data source provided by the USPS in connection with their "Confirm Service" product. However, as practitioners will appreciate, other embodiments may download data from any external data source that provides useful and accurate data. For instance the BPMS 115 may be interconnected to an external data source 161 via a second network, referred to as the external gateway 163. The external gateway 163 may include any hardware and/or software suitably configured to facilitate communications and/or process transactions between the BPMS 115 and the external data source 161. Interconnection gateways are commercially available and known in the art. External gateway 163 may be implemented through commercially available hardware and/or software, through custom hardware and/or software components, or through a combination thereof. External gateway 163 may reside in a variety of configurations and may exist as a standalone system or may be a software component residing either inside system 100, the external data source 161 or any other known configuration. External gateway 163 may be configured to deliver data directly to system 100 components (such as UDDM 180) and to interact with other systems and components such as LMR database 170. In one embodiment, the external gateway 163 may comprise web services that are invoked to exchange data between the various disclosed systems. The external gateway 163 represents existing proprietary networks that presently accommodate data exchange for data such as financial transactions, customer demographics, billing transactions and the like. The external gateway 163 is a closed network that is assumed to be secure from eavesdroppers.

As practitioners will appreciate, embodiments are not limited to the exemplary databases described above, nor do embodiments necessarily utilize each of the disclosed exemplary databases. In addition to the components described above, the system 100 and the BPMS 115 may further include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. A representative list of various databases used herein includes: the customer account database 155, the LMR database 160, the USPS download database 175, the USPS tracking database 185, an external data source 161 and/or other databases that aid in the functioning of the system.

As will be appreciated by one of ordinary skill in the art, one or more system 100 components may be embodied as a customization of an existing system, an add-on product, upgraded software, a stand-alone system (e.g., kiosk), a distributed system, a method, a data processing system, a device for data processing, and/or a computer program product. Accordingly, individual system 100 components may take the form of an entirely software embodiment, an entirely hardware embodiment, or an embodiment combining aspects of both software and hardware. Furthermore, individual system 100 components may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The invention contemplates uses in association with billing systems, accounts receivable systems, operational management systems, cash management tools, logistical planning tools, business intelligence systems, reporting systems, web services, pervasive and individualized solutions, open source, biometrics, mobility and wireless solutions, commodity computing, grid computing and/or mesh computing. For example, in an embodiment, the web client 110 is configured with a biometric security system that may be used for providing biometrics as a secondary form of identification. The biometric security system may include a transaction device and a reader communicating with the system. The biometric security system also may include a biometric sensor that detects biometric samples and a device for verifying biometric samples. The biometric security system may be configured with one or more biometric scanners, processors and/or systems. A biometric system may include one or more technologies, or any portion thereof, such as, for example, recognition of a biometric. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof.

Web client 110 comprises any hardware and/or software suitably configured to facilitate requesting, retrieving, updating, analyzing, entering or modifying data such as marketing data or any information discussed herein. Web client 110 includes any device (e.g., personal computer), which communicates (in any manner discussed herein) with the BPMS 115 via any network discussed herein. Such browser applications comprise Internet browsing software installed within a computing unit or system to conduct online transactions and communications. These computing units or systems may take the form of a computer or set of computers, although other types of computing units or systems may be used, including laptops, notebooks, hand-held computers, set-top boxes, workstations, computer-servers, mainframe computers, mini-computers, PC servers, pervasive computers, network sets of computers, and/or the like. Practitioners will appreciate that the web client 110 may or may not be in direct contact with the BPMS 115. For example, the web client 110 may access the services of the BPMS 115 through another server, which may have a direct or indirect connection to Internet server 125.

As those skilled in the art will appreciate, the web client 110 includes an operating system (e.g., Windows NT, 95/98/2000, OS2, UNIX, Linux, Solaris, MacOS, etc.) as well as various conventional support software and drivers typically associated with computers. Web client 110 may include any suitable personal computer, network computer, workstation, mini-computer, mainframe, mobile device or the like. Web client 110 can be in a home or business environment with access to a network. In an embodiment, access is through a network or the Internet through a commercially available web-browser software package.

Web client 110 may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., Gilbert Held, Understanding Data Communications (1996), which is hereby incorporated by reference. It is noted that the network may be implemented as other types of networks, such as an interactive television (ITV) network.

Firewall 120, as used herein, may comprise any hardware and/or software suitably configured to protect the BPMS 115 components from users of other networks. Firewall 120 may reside in varying configurations including stateful inspection, proxy-based and packet filtering, among others. Firewall 120 may be integrated as software within Internet server 125, any other system components, or may reside within another computing device or may take the form of a standalone hardware component.

Internet server 125 may include any hardware and/or software suitably configured to facilitate communications between the web client 110 and one or more BPMS 115 components. Further, Internet server 125 may be configured to transmit data to the web client 110 within markup language documents. As used herein, "data" may include encompassing information such as commands, queries, files, data for storage, and/or the like in digital or any other form. Internet server 125 may operate as a single entity in a single geographic location or as separate computing components located together or in separate geographic locations.

Internet server 125 may provide a suitable web site or other Internet-based graphical user interface, which is accessible by users. An Internet server may provide a suitable web site or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, InterBase, etc., may be used to provide an Active Data Object (ADO) compliant database management system. In one embodiment, the Apache web server is used in conjunction with a Linux operating system, a MySQL database, and/or the Perl, PHP, and Python programming languages.

Any of the communications, inputs, storage, databases or displays discussed herein may be facilitated through a web site having web pages. The term "web page" as it is used herein is not meant to limit the type of documents and applications that may be used to interact with the user. For example, a typical web site may include, in addition to standard HTML documents, various forms, Java applets, JavaScript, active server pages (ASP), Microsoft .NET Framework, common gateway interface scripts (CGI), extensible markup language (XML), dynamic HTML, AJAX (Asynchronous Javascript And XML), cascading style sheets (CSS), helper applications, plug-ins, and/or the like. A server may include a web service that receives a request from a web server, the request including a URL (http://yahoo.com/stockquotes/ge) and an IP address (123.56.789). The web server retrieves the appropriate web pages and sends the data or applications for the web pages to the IP address. Web services are applications that are capable of interacting with other applications over a communications means, such as the Internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003) or WEB SERVICES ARCHITECTURE, W3C Working Group Note 11 Feb. 2004, available at http://www.w3.org/TR/2004/NOTE-ws-arch-20040211, both of which are hereby incorporated by reference.

Application server 145 may include any hardware and/or software suitably configured to serve applications and data to a connected web client 110. Like Internet server 125, the application server 145 may communicate with any number of other servers, databases and/or components through any means known in the art. Further, the application server 145 may serve as a conduit between the web client 110 and the various systems and components of the BPMS 115. Internet server 125 may interface with the application server 145 through any means known in the art including a LAN/WAN, for example. Application server 145 may further invoke software modules such as the LMRM 147 in response to user 105 requests.

In order to control access to the application server 145 or any other component of the BPMS 115, Internet server 125 may invoke an authentication server 130 in response to user 105 submissions of authentication credentials received at Internet server 125. Authentication server 130 may include any hardware and/or software suitably configured to receive authentication credentials, encrypt and decrypt credentials, authenticate credentials, and/or grant access rights according to pre-defined privileges attached to the credentials. Authentication server 130 may grant varying degrees of application and data level access to users based on information stored within the user database 140.

Any database depicted or implied by FIG. 1 may include any hardware and/or software suitably configured to facilitate storing identification, authentication credentials, and/or user permissions. One skilled in the art will appreciate that system 100 may employ any number of databases in any number of configurations. Further, any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), Microsoft Office SharePoint Server, or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of the invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In an embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the system by multiple and unrelated owners of the data sets. For example, a first data set which may be stored may be provided by a first party, a second data set which may be stored may be provided by an unrelated second party, and yet a third data set which may be stored, may be provided by a third party unrelated to the first and second parties. Each of the three data sets in this example may contain different information that is stored using different data storage formats and/or techniques. Further, each data set may contain subsets of data that also may be distinct from other subsets.

As stated above, in various embodiments of system 100, the data can be stored without regard to a common format. However, in one embodiment of the invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand-alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand-alone device, the appropriate option for the action to be taken. System 100 contemplates a data storage arrangement wherein the header or trailer, or header or trailer history, of the data is stored on the transaction instrument in relation to the appropriate data.

One skilled in the art will also appreciate that, for security reasons, any databases, systems, devices, servers or other components of system 100 may consist of any combination thereof at a single location or at multiple locations, wherein each database or system includes any of various suitable security features, such as firewalls, access codes, encryption, decryption, compression, decompression, and/or the like.

The invention may be described herein in terms of functional block components, screen shots, optional selections and various processing steps. It should be appreciated that such functional blocks may be realized by any number of hardware and/or software components configured to perform the specified functions. For example, system 100 may employ various integrated circuit components, e.g., memory elements, processing elements, logic elements, look-up tables, and/or the like, which may carry out a variety of functions under the control of one or more microprocessors or other control devices. Similarly, the software elements of system 100 may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that system 100 may employ any number of conventional techniques for data transmission, signaling, data processing, network control, and/or the like. Still further, system 100 could be used to detect or prevent security issues with a client-side scripting language, such as JavaScript, VBScript or the like. For a basic introduction of cryptography and network security, see any of the following references: (1)

"Applied Cryptography: Protocols, Algorithms, And Source Code In C," by Bruce Schneier, published by John Wiley & Sons (Second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

These software elements may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, web sites, web forms, prompts, etc. Practitioners will appreciate that the illustrated steps described herein may comprise in any number of configurations including the use of windows, web pages, web forms, popup windows, prompts and/or the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

Practitioners will appreciate that there are a number of methods for displaying data within a browser-based document. Data may be represented as standard text or within a fixed list, scrollable list, drop-down list, editable text field, fixed text field, pop-up window, and/or the like. Likewise, there are a number of methods available for modifying data in a web page such as, for example, free text entry using a keyboard, selection of menu items, check boxes, option boxes, and/or the like.

Referring now to the figures, the block system diagrams and process flow diagrams represent mere embodiments of the invention and are not intended to limit the scope of the invention as described herein. For example, the steps recited in FIGS. 2-4 may be executed in any order and are not limited to the order presented. It will be appreciated that the following description makes appropriate references not only to the steps depicted in FIGS. 2-4, but also to the various system components as described above with reference to FIG. 1.

Figure 2:
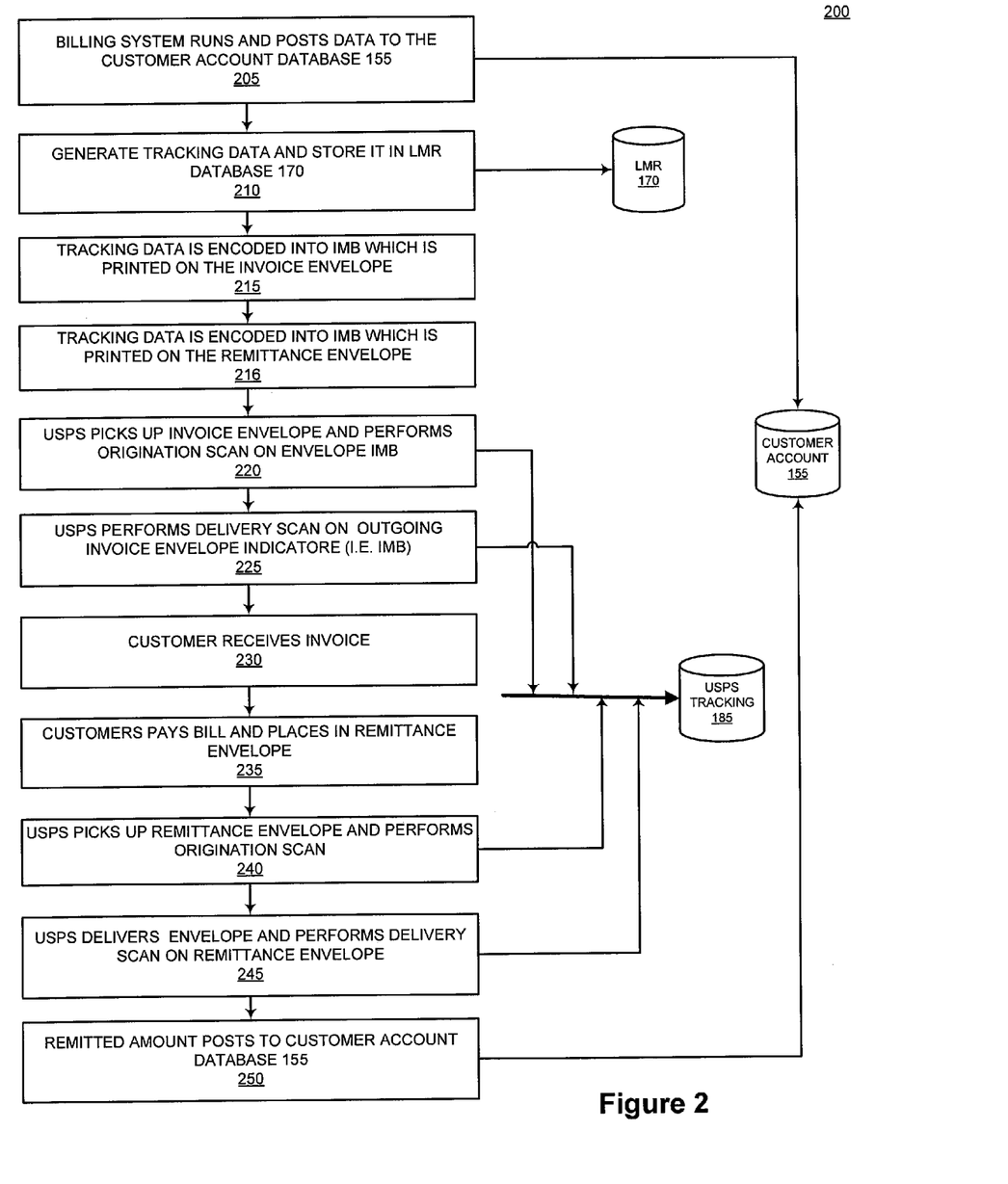
FIG. 2 is a representative process flow diagram for tracking lifecycle data, in accordance with one embodiment of the present invention.

With reference to FIG. 2, a representative process for tracking the lifecycle of a communication with a customer is shown. The lifecycle may involve any interaction between an organization and another organization. For instance, a lifecycle may involve sending a marketing solicitation, a consumer survey or a bill to a customer or potential customer and receiving a response. In one embodiment, a billing organization generates a bill and a receivable is generated to indicate that the organization expects to receive payment by the responding entity (e.g. a customer) (Step 205). Tracking data is generated in order to track the movement of the bill and its associated components (e.g. the remittance portion of the bill) throughout the payment lifecycle.

In the representative embodiment illustrated in FIG. 2, LMRM 147 generates two tracking data sets, one for tracking the invoice portion of the bill and one for tracking the remittance portion of the bill, and stores the tracking datasets in LMR database 170 (Step 210). The information in separate tracking datasets is linked using codes, referential lookup tables, pointers or any other technique known in the art suitable for linking or associating data. The present invention does not require multiple tracking data sets; other embodiments may generate only one tracking dataset. For instance, a single tracking dataset capable of maintaining multiple origin and destination data may be used to track both the invoice and remittance of a customer bill.

The bill is encoded with an indicator which represents the data from the tracking dataset. For instance, in one embodiment, LMRM 147 encodes the information from the invoice tracking dataset in an IMB which is printed on the invoice envelope (Step 215). Similarly, LMRM 147 encodes the information from the remittance tracking dataset which is printed on the remittance portion of the bill (Step 216). The invention is not limited to using an IMB as the indicator. The indicator may take any form or format, as disclosed herein. For instance, in one embodiment, an RFID is used to track the movement of the solicitation through the lifecycle. In the context of conducting a survey, an RFID is attached to the survey and the survey is tracked as it completes the loop from the soliciting organization to the responding entity (i.e. the entity being surveyed) and to the organization collecting the survey data.

Continuing with the representative embodiment in FIG. 2, the tracking indicators are printed as an IMB on portions of the bill (Steps 215, 216). However, other embodiments of the present invention may not include printing as the means for associating the indicator with the solicitation. In other embodiments the indicator, in any of its various forms disclosed above, may be suitably attached or associated to any portion of the solicitation such that the indicator is capable of being detected. For instance, IMB's may be printed on the bill and remittance themselves and the corresponding envelopes may have a window, aperture or other suitable structure that allows the IMB's to be scanned. As discussed above, other embodiments use other types of indicators. Therefore, as practitioners will appreciate, attaching or associating the indicator with the solicitation such that it is capable of being detected as it traverses the lifecycle may be accomplished using any suitable means.

As the solicitation traverses the lifecycle from the soliciting organization to the responding entity and to the ultimate point of termination, the indicators associated with the solicitation are detected at any point. The information detected is stored or transmitted such that the soliciting organization has access to the information. As practitioner's will appreciate, the invention is not limited by the type of solicitation, the entity detects the indicator or the number of entities and/or steps in a lifecycle. For example, the one solicitation may result in multiple responses, all of which are tracked and linked to each other. In one embodiment, a market research organization sends a package of coupons to a company who distributes the coupons to its employees and the response is tracked when the coupon is redeemed. Moreover, in one embodiment, multiple solicitations may be linked to each other which may be linked to a single or to multiple responses.

As the solicitation traverses the lifecycle from the soliciting organization to the responding entity, and to the ultimate point of termination, the indicators associated with the solicitation are detected. The information detected is stored or transmitted such that the soliciting organization has access to the information. In the representative embodiment illustrated in FIG. 2, the solicitation is a customer bill, the soliciting organization is the billing organization and the indicator is detected by the USPS. The billing organization places the bill in the USPS mail and the USPS tracks the bill through the delivery process by scanning the indicator. The USPS performs an origination scan of the invoice tracking indicator on the bill's envelope (Step 220). At the USPS destination facility the USPS performs a destination scan just prior to the bill arriving at the customer address for delivery (Step 225). The customer receives the invoice in the mail (Step 230).

The customer pays the bill and places the remittance envelope in the mail (Step 235). USPS picks up the remittance envelope and performs an origination scan of the remittance tracking indicator (Step 240). USPS delivers the envelope to the remittance address and performs a delivery scan on the remittance tracking indicator (Step 245). The billing organization tracks the progress of the payment as it is processed and posted to the organization's customer account database 155 (Step 250). As illustrated in FIG. 2, each time the USPS scans the tracking indicator (i.e. the IMB in this example), the information that is detected in the scan, along with additional information indicating the time, location and other data is stored in the USPS tracking database 185.

Information detected and stored during the solicitation lifecycle is stored or transmitted such that the soliciting organization has access to the tracking information. As discussed above, in one embodiment, the USPS detects the indicator, augments the detected data with additional tracking data and stores all the data on the USPS tracking database 185 (Steps 220, 225, 240, 245 and 250). As practitioners will appreciate, tracking the progress of a solicitation as it travels from one location to another is not limited to the USPS and may be performed by a wide variety of service providers. For instance, in one embodiment, a wireless communication provider detects an indicator that is a GPS signal, detects the data encoded in the signal, augments it with additional data (e.g. time, location and status corresponding to the detection) and stores the tracking data on their own database or on a third-party database. In one embodiment, tracking data is transmitted directly to the organization that originated the solicitation.

Figure 3:
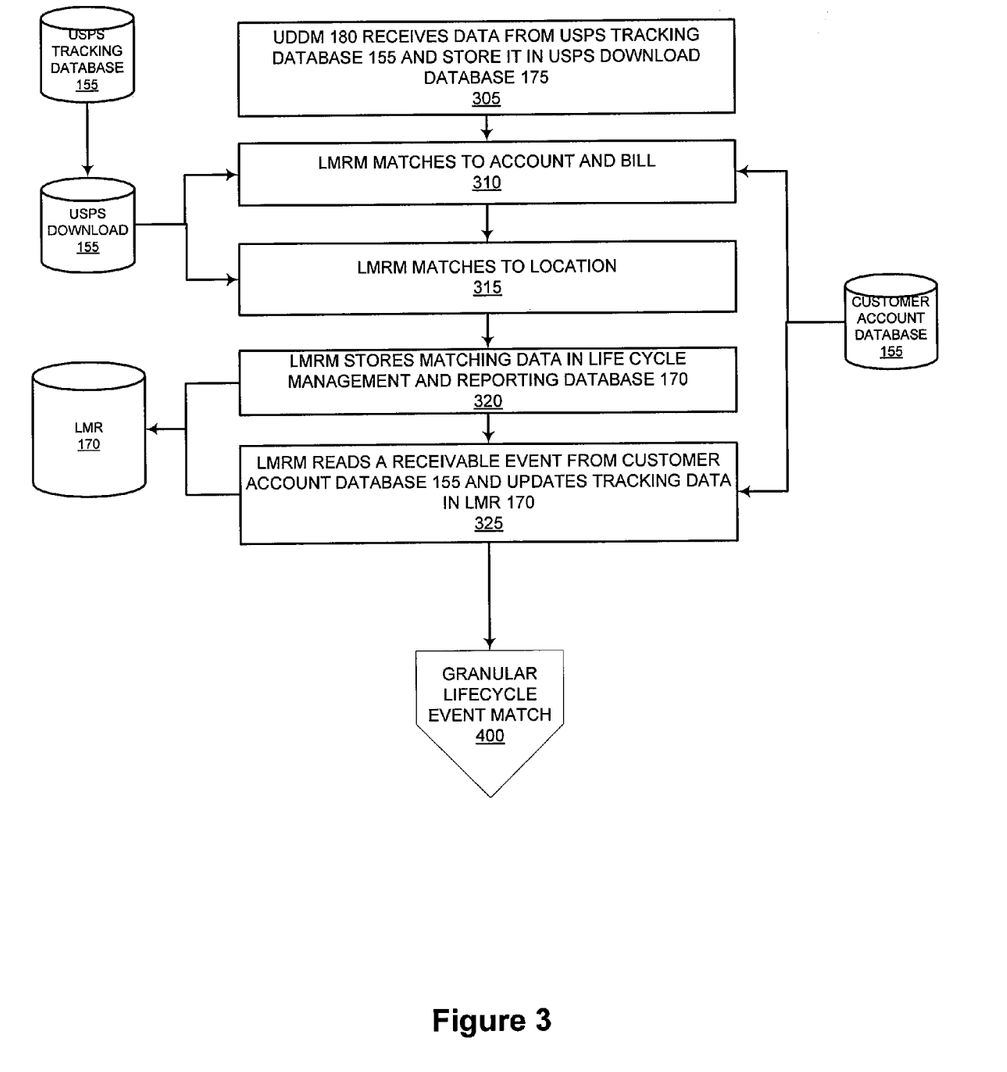
FIG. 3 is a representative process flow diagram for collecting lifecycle tracking data, matching it with other identifying data and storing the matched data in a management reporting database, in accordance with one embodiment of the present invention.

The tracking data is received by the soliciting organization. In the embodiment shown in FIG. 3, the UDDM 180 coordinates the transfer of information from the USPS tracking database 185 to the USPS download database 175 (Step 305). In one embodiment, the data is downloaded using file transfer protocol (FTP). However, as practitioners will appreciate, the data transfer may be accomplished in a variety of upload, download and data transfer methods. In another embodiment, the data is transmitted directly to the soliciting organization's database, so the file transfer (such as that depicted in Step 305) may not occur. LMRM 147 matches the bill tracking data (generated in Step 210) which was used to encode the bill tracking indicators (Steps 215 and 216) to data in the USPS download database 175 (Step 310). In one embodiment, the customer account and bill number stored as bill tracking data in LMRM 147 is matched with tracking event records in the USPS download database 175. In one embodiment, LMRM also matches data to data stored in customer account database 155 (Step 310). LMRM matches the data indication location in USPS download database 175 to the location data stored in LMR 170 (Step 315). LMRM 147 updates LMR 170 with the account, bill and location matching data. LMRM reads a receivable event (Step 205) and/or a remit event (Step 250), as shown in FIG. 2, from customer account database 155 and updates bill tracking data in LMR 170 (Step 325), as shown in FIG. 3. With respect to FIG. 3, the matching steps produce a complete set of bill payment tracking data which is valuable in the process of FIG. 4 for calculating statistics and understanding customer payment habits. "Matched tracking data" includes data that has been processed, validated and/or matched (for example, as represented in one embodiment, by the process of FIG. 3) such that the data is appropriately linked and augmented to a form that is useful and valuable to an organization.

Figure 4:
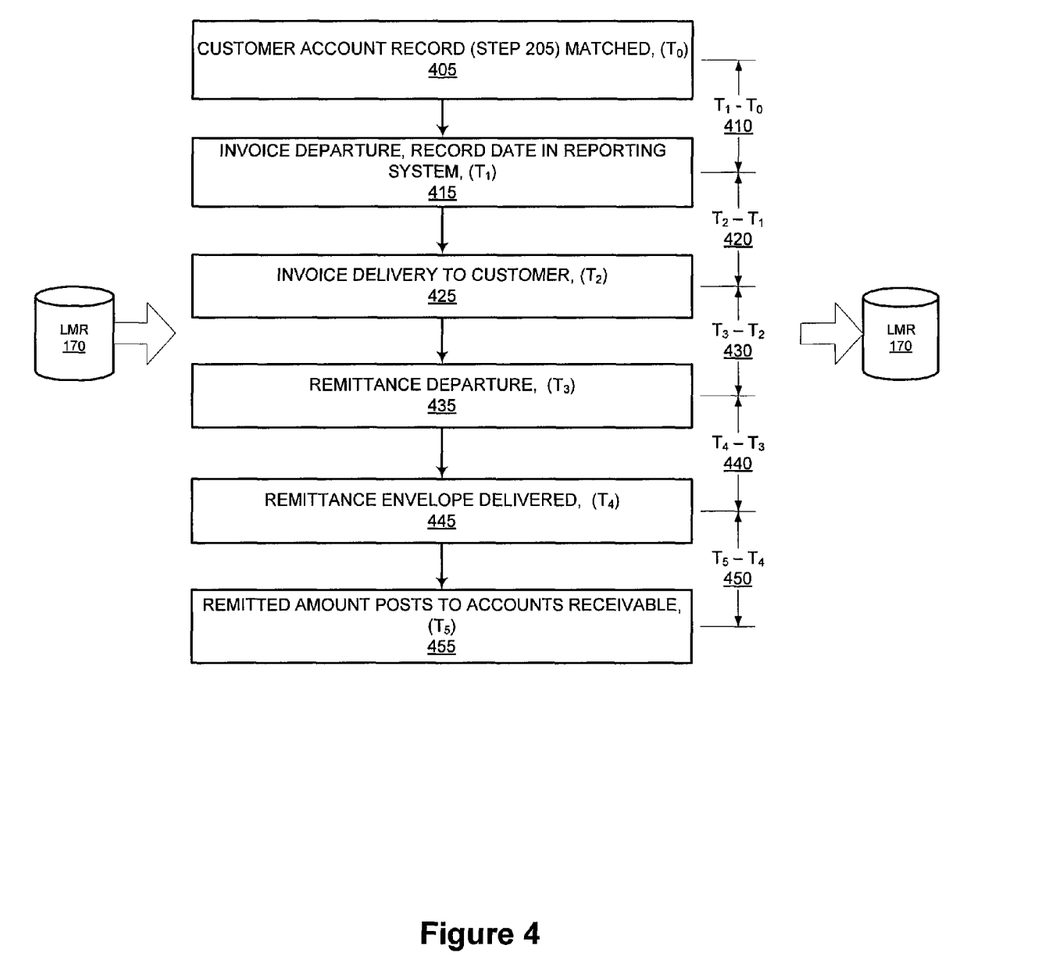
FIG. 4 is a representative process for mapping the lifecycle data to business events and performing calculations to enhance the business value of the data, in accordance with one embodiment of the present invention.

FIG. 4 illustrates a representative process of using matched tracking data and mapping it to business events and statistics to create valuable operational analytical data. In one embodiment, LMRM 147 reads matched tracking data and maps the data to operational events and calculates customer bill payment statistics to produce granular data that more accurately reveals the full bill-to-payment lifecycle for an organization such as a transaction account issuer (e.g. a bank). The event that shows the account receivable record being created (Step 205) is Time 0 ($T_0$) (Step 405). The event that corresponds to the origination scan of the indicator on the invoice envelope (Step 220) is $T_1$ (Step 415). The difference between these times ($T_1-T_0$) represents the total time used by the organization to generate the bill and prepare it for mailing to the customer (Step 410). Similar calculations are made for each subsequent event in the bill payment tracking data for times $T_1$ through $T_5$. At $T_2$, the invoice is delivered to the customer, and at $T_3$, the remittance is mailed by the customer. The difference between these two events ($T_3-T_2$) is a period of time of particular interest to an organization. Existing systems and methods provide little or no visibility into this time period. In the representative embodiment shown in FIG. 4, the invoice tracking data and the remittance tracking data are linked at the time they are generated and the data used to establish the link is stored in LMR database 170 (Step 210) and encoded in the indicators. (Steps 215 and 216).

Existing systems do not directly track the event corresponding to the mailing of the remittance. Rather, in existing systems, calculating the time the customer takes to pay a bill after receiving an invoice is based upon when the organization receives the remittance envelope in the mail. Therefore, it is not possible to calculate with certainty the true time that the customer takes to pay the bill. At best, an organization estimates the average mail time and subtracts that time from the total duration between when the invoice was delivered to the customer to when the organization receives payment. The more granular data provided by the present invention is invaluable to organizations that rely on a complete and accurate picture of customer payment activity. Many organizations use this information to drive marketing strategy, prioritize billing operations, manage cash flow expectations, etc.

While the steps outlined above represent a specific embodiment of the invention, practitioners will appreciate that there are any number of computing algorithms and user interfaces that may be applied to create similar results. The steps are presented for the sake of explanation only and are not intended to limit the scope of the invention in any way.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims of the invention. It should be understood that the detailed description and specific examples, indicating exemplary embodiments of the invention, are given for purposes of illustration only and not as limitations. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above. Reference to an element in the singular is not intended to mean "one and only one" unless explicitly so stated, but rather "one or more." Moreover, where a phrase similar to 'at least one of A, B, and C' is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

We claim:

1. A computer-based method for tracking a payment lifecycle comprising:
    encoding, by a tracking computer for tracking the payment lifecycle, first invoice tracking data as an invoice tracking indicator on a customer bill such that the invoice tracking indicator is configured to be detected, wherein the first invoice tracking data is at least a portion of a payment lifecycle tracking dataset which is stored in a tracking database, and wherein the first invoice tracking data comprises a first invoice identifier;
    encoding, by the tracking computer, the first invoice identifier and first remittance tracking data as a remittance tracking indicator on a customer bill such that the remittance tracking indicator is configured to be detected, wherein the first remittance tracking data is at least a portion of the payment lifecycle tracking dataset;
    receiving, by the tracking computer and from a first service provider, at least a portion of second invoice tracking data, wherein the second invoice tracking data is based on detection of the invoice tracking indicator and includes the first invoice identifier along with additional information;
    matching, by the tracking computer and based upon the first invoice identifier, the payment lifecycle tracking dataset with the second invoice tracking data to create matched tracking data;
    receiving, by the tracking computer, at least a portion of second remittance tracking data from a second service provider, wherein the second remittance tracking data is based on detection of the remittance tracking indicator and includes the first invoice identifier and along with additional information;
    matching, by the tracking computer and based upon the first invoice identifier, the payment lifecycle tracking dataset with the second remittance tracking data to update the matched tracking data;
    analyzing, by the tracking computer, customer payment habits based on the matched tracking data, wherein the analyzing comprises:
        determining, by the tracking computer and based upon the matched tracking data, a first time as a date and time the customer bill was generated;
        determining, by the tracking computer and based upon the matched tracking data, a second time as a date and time the customer bill was delivered to a customer associated with the first bill;
        determining, by the tracking computer and based upon the matched tracking data, a third time as a date and time the remittance was picked up from the customer;
        determining, by the tracking computer and based upon the matched tracking data, a fourth time as a date and time the remittance was received a remittance destination;
        calculating, by the tracking computer, a first customer payment statistic in a plurality of customer payment statistics as a difference in the third time and the second time; and
        calculating, by the tracking computer, a second customer payment statistic in the plurality of customer payment statistics as a difference in the fourth time and the third time,
    modifying, by the tracking computer and based upon at least one of the first customer payment statistic and the second customer payment statistic, a customer bill printing schedule.

2. The method of claim 1, wherein the invoice tracking indicator and the remittance tracking indicator are at least one of: an intelligent mail barcode, a radio frequency identifier (RFID), a global positioning system signal, a signal, a code, device, number, letter, symbol, digital certificate, smart chip, digital signal, analog signal, biometric, PIN, Internet code, magnetic stripe, optical, and transponder.

3. The method of claim 1, wherein the invoice tracking indicator and the remittance tracking indicator are intelligent mail barcodes.

4. The method of claim 1, wherein the invoice tracking indicator and the remittance tracking indicator are intelligent mail barcodes and the service provider is a postal carrier.

5. The method of claim 1, wherein:
    the invoice tracking indicator and the remittance tracking indicator are intelligent mail barcodes;
    the first service provider is a postal carrier and
    the detection is done by scanning the intelligent mail barcodes.

6. The method of claim 1, wherein the additional information is at least one of: generated by the first service provider, obtained from a database of the service provider and obtained from a third party database.

7. The method of claim 1, wherein:
    the invoice tracking indicator and the remittance tracking indicator are intelligent mail barcodes;
    the second service provider is a postal carrier;
    detection is done by scanning the intelligent mail barcodes; and
    the additional information is at least one of: generated by the second service provider, obtained from a database of the service provider and obtained from a third party database.

8. The method of claim 1 further comprising calculating customer payment statistics based upon the matched tracking data to formulate a customer payment habit and storing the customer payment habit in the tracking database.

9. The method of claim 1 further comprising:
calculating customer payment statistics based upon the matched tracking data to formulate a customer payment habit;
storing the customer payment habit in the tracking database; and
implementing customer-based work prioritization based upon customer payment habit.

10. The method of claim 1 further comprising:
calculating customer payment statistics based upon the matched tracking data to formulate a customer payment habit;
storing the customer payment habit in the tracking database; and
modifying cash flow forecasts based upon customer payment habit.

11. The method of claim 1, further comprising generating the payment lifecycle tracking dataset and updating the payment lifecycle dataset with the matched tracking data.

12. The method of claim 1, wherein the first indicator is associated with a plurality of second indicators.

13. The method of claim 1, wherein the payment lifecycle is a direct customer solicitation lifecycle.

14. The method of claim 1, wherein the customer payment lifecycle is a marketing solicitation and response lifecycle.

15. A non-transitory computer-readable storage medium having computer-executable instructions stored thereon that, if executed by a tracking computer for tracking a payment lifecycle, causes the tracking computer to perform operations, comprising:
encoding, by the tracking computer, first invoice tracking data as an invoice tracking indicator on a customer bill such that the invoice tracking indicator is configured to be detected, wherein the first invoice tracking data is at least a portion of a payment lifecycle tracking dataset which is stored in a tracking database, and wherein the first invoice tracking data comprises a first invoice identifier;
encoding, by the tracking computer, the first invoice indicator and first remittance tracking data as a remittance tracking indicator on a customer bill such that the remittance tracking indicator is configured to be detected, wherein the first remittance tracking data is at least a portion of the payment lifecycle tracking dataset;
receiving, by the tracking computer from a first service provider, at least a portion of second invoice tracking data, wherein the second invoice tracking data is based on detection of the invoice tracking indicator and includes the first invoice identifier along with additional information;
matching, by the tracking computer and based upon the first invoice identifier, the payment lifecycle tracking dataset with the second invoice tracking data to create matched tracking data;
receiving, by the tracking computer, at least a portion of second remittance tracking data from a second service provider, wherein the second remittance tracking data is based on detection of the remittance tracking indicator and includes the first invoice identifier and along with additional information;
matching, by the tracking computer and based upon the first invoice identifier, the payment lifecycle tracking dataset with the second remittance tracking data to update the matched tracking data;
analyzing, by the tracking computer, customer payment habits based on the matched tracking data, wherein the analyzing comprises:
determining, by the tracking computer and based upon the matched tracking data, a first time as a date and time the customer bill was generated;
determining, by the tracking computer and based upon the matched tracking data, a second time as a date and time the customer bill was delivered to a customer associated with the first bill;
determining, by the tracking computer and based upon the matched tracking data, a third time as a date and time the remittance was picked up from the customer;
determining, by the tracking computer and based upon the matched tracking data, a fourth time as a date and time the remittance was received a remittance destination;
calculating, by the tracking computer, a first customer payment statistic in a plurality of customer payment statistics as a difference in the third time and the second time; and
calculating, by the tracking computer, a second customer payment statistic in the plurality of customer payment statistics as a difference in the fourth time and the third time,
modifying, by the tracking computer and based upon at least one of the first customer payment statistic and the second customer payment statistic, a customer bill printing schedule.

16. A payment lifecycle management system comprising:
a network interface communicating with a memory;
the memory communicating with a processor for tracking a payment lifecycle, the memory comprising a tracking database for storing a payment lifecycle dataset; and
the processor, when executing a computer program for tracking, performs operations comprising:
encoding, by the processor, first invoice tracking data as an invoice tracking indicator on a customer bill such that the invoice tracking indicator is configured to be detected, wherein the first invoice tracking data is at least a portion of a payment lifecycle tracking dataset which is stored in a tracking database, and wherein the first invoice tracking data comprises a first invoice identifier;
encoding, by the processor, the first invoice indicator and first remittance tracking data as a remittance tracking indicator on a customer bill such that the remittance tracking indicator is configured to be detected, wherein the first remittance tracking data is at least a portion of the payment lifecycle tracking dataset;
receiving, by the processor from a first service provider, at least a portion of second invoice tracking data, wherein the second invoice tracking data is based on detection of the invoice tracking indicator and includes the first invoice identifier along with additional information;
matching, by the processor and based upon the first invoice identifier, the payment lifecycle tracking dataset with the second invoice tracking data to create matched tracking data;
receiving, by the processor, at least a portion of second remittance tracking data from a second service provider, wherein the second remittance tracking data is based on detection of the remittance tracking indicator and includes the first invoice identifier and along with additional information;

matching, by the processor and based upon the first invoice identifier, the payment lifecycle tracking dataset with the second remittance tracking data to update the matched tracking data;

analyzing, by the processor, customer payment habits based on the matched tracking data, wherein the analyzing comprises:

determining, by the processor and based upon the matched tracking data, a first time as a date and time the customer bill was generated;

determining, by the processor and based upon the matched tracking data, a second time as a date and time the customer bill was delivered to a customer associated with the first bill;

determining, by the processor and based upon the matched tracking data, a third time as a date and time the remittance was picked up from the customer;

determining, by the processor and based upon the matched tracking data, a fourth time as a date and time the remittance was received a remittance destination;

calculating, by the processor, a first customer payment statistic in a plurality of customer payment statistics as a difference in the third time and the second time; and     calculating, by the processor, a second customer payment statistic in the plurality of customer payment statistics as a difference in the fourth time and the third time,   modifying, by the processor and based upon at least one of the first customer payment statistic and the second customer payment statistic, a customer bill printing schedule.

17. The system of claim 16, the operations further comprising generating the payment lifecycle tracking dataset.

\* \* \* \* \*